Oct. 26, 1965  TOHCHUNG WEI  3,213,848
BURNER FOR COOKING IN MULTIPLE-FOOD VESSELS
Filed Jan. 6, 1964  3 Sheets-Sheet 1

INVENTOR.
TOHCHUNG WEI
BY Plochek Haulsbury
ATTORNEYS

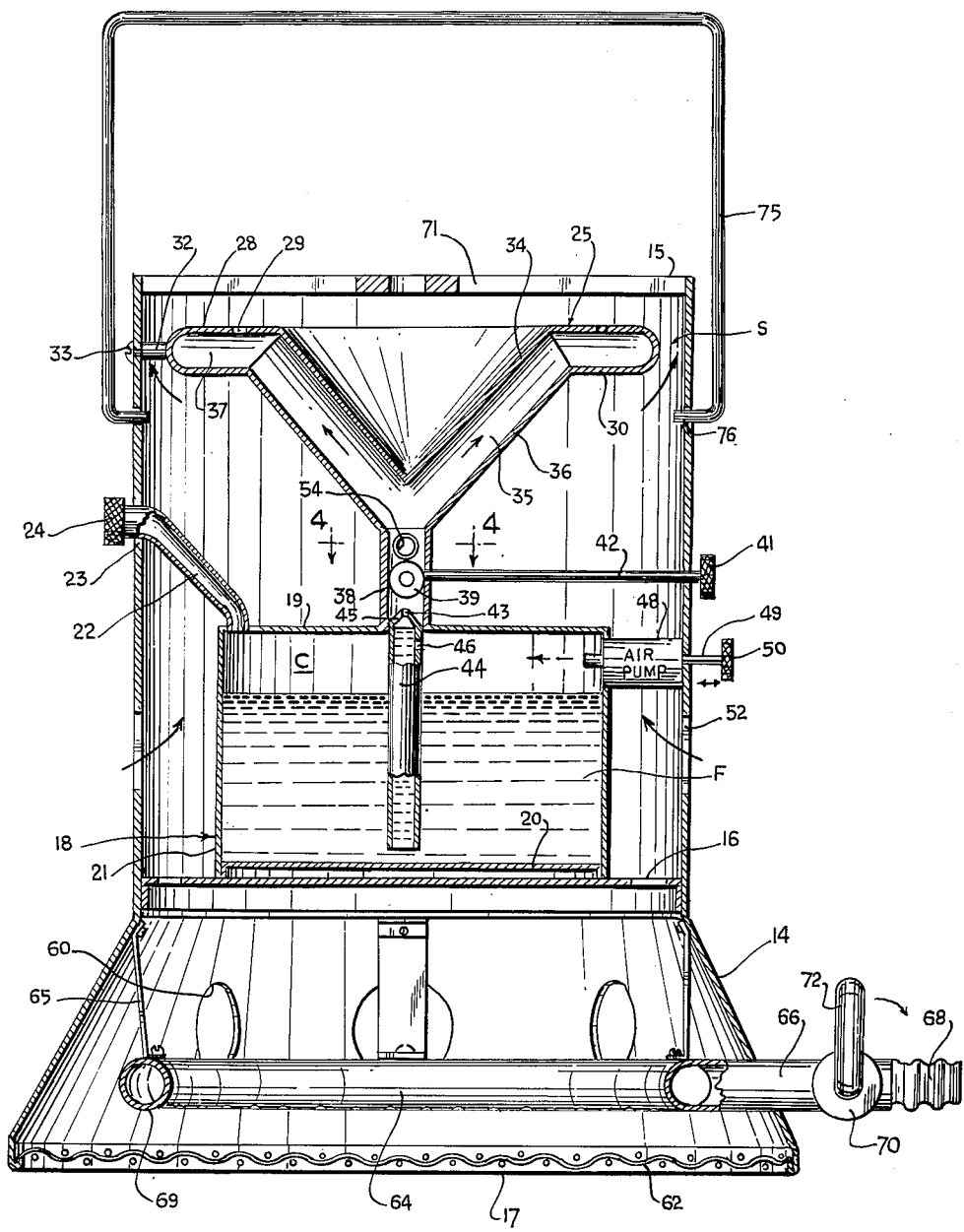

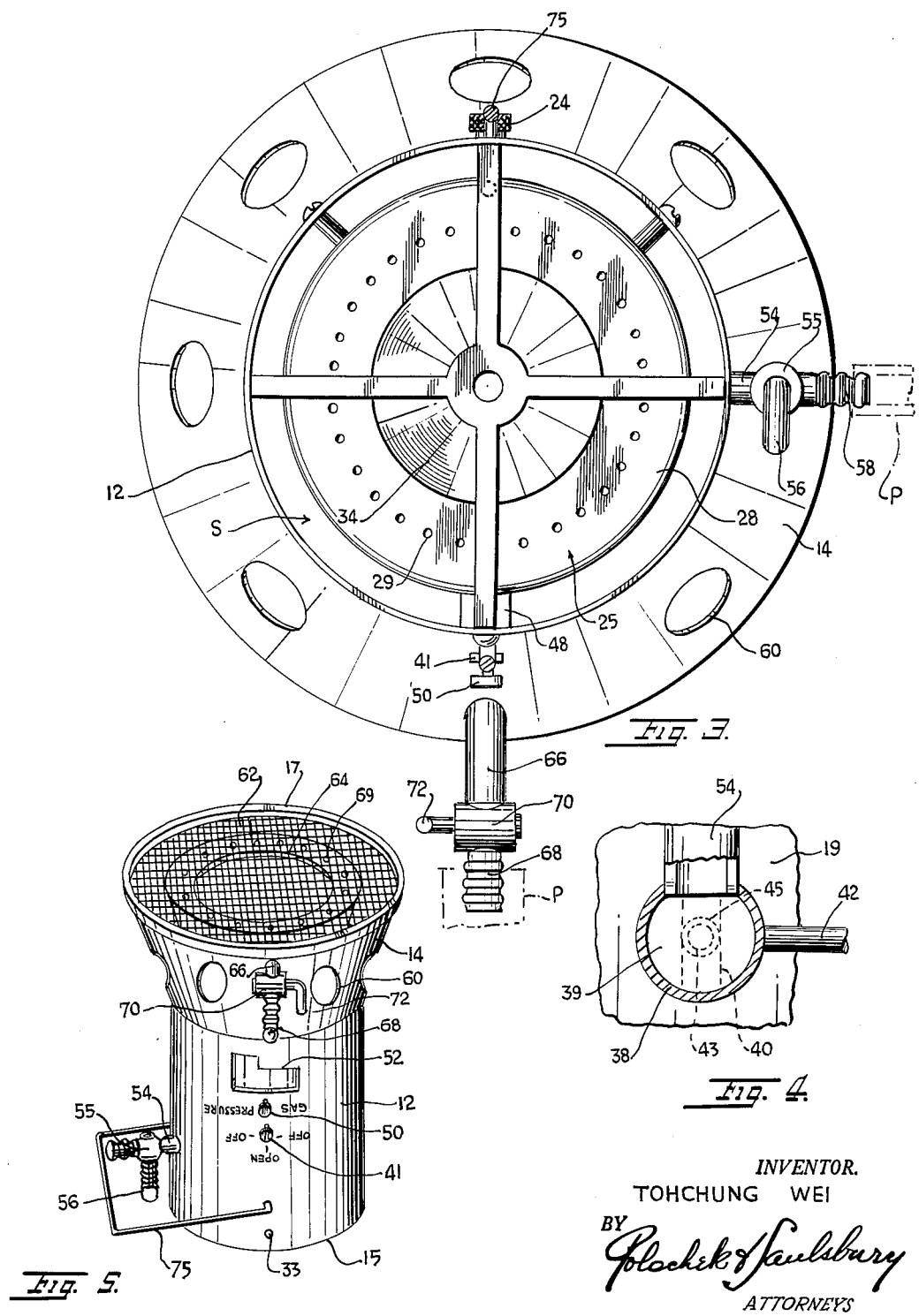

United States Patent Office 3,213,848
Patented Oct. 26, 1965

3,213,848
BURNER FOR COOKING IN MULTIPLE-FOOD VESSELS
Tohchung Wei, 169 E. Broadway, New York, N.Y.
Filed Jan. 6, 1964, Ser. No. 335,927
4 Claims. (Cl. 126—40)

This invention relates to a heating device for food vessels and more particularly concerns a fuel burning device for generating heat for cooking and similar purposes.

According to the invention, there is provided a cylindrical housing having open opposite ends. A tank for liquid fuel is mounted in the housing. In the tank is an atomizer for discharging a spray of atomized fuel through a main conduit to a ring burner supported in the cylindrical housing. The main conduit is provided with a branch conduit for gaseous fuel which may be piped from a remote source or an auxiliar fuel container to the ring burner. Valves are provided in the main conduit and branch conduit for controlling flow of fuel therein. A grate is provided on one end of the housing near the ring burner for supporting a food vessel thereon. At the other end of the housing is a second ring burner supported by brackets on a flaring portion of the housing. The second ring burner has openings facing the open other end of the housing. A screen grid is provided at the open other end of the housing. The second ring burner has an outwardly extending valved conduit to which an external source of gaseous fuel may be supplied. The device may be mounted on a second vessel and both ring burners may be operated at the same time to heat both vessels simultaneously. Alternatively, the device can be inverted and a vessel can be mounted on the flaring open other end of the housing.

It is therefore one object of the invention to provide a heating device for food vessels or the like, in which a cylindrical housing is provided with an internal tank for supplying fuel under pressure to a ring burner at one open end of the housing.

Another object is to provide a device as described, wherein the tank is connected to the ring burner via a main conduit having a control valve, with a valved branch conduit connected to the main conduit for supplying fuel to the ring burner from a fuel source external to the device.

A further object is to provide a device as described, with another ring burner at the open other end of the cylindrical housing having an outwardly extending valved conduit for conveying gaseous fuel to the second ring burner from a fuel source external to the device.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 2 is a vertical sectional view taken on line 2—2 of FIG. 1.

FIG. 3 is a cross-sectional view taken on line 3—3 of FIG. 1.

FIG. 4 is an enlarged fragmentary sectional view taken on line 4—4 of FIG. 2.

FIG. 5 is a reduced perspective view of the device in an inverted position.

Figure 1:
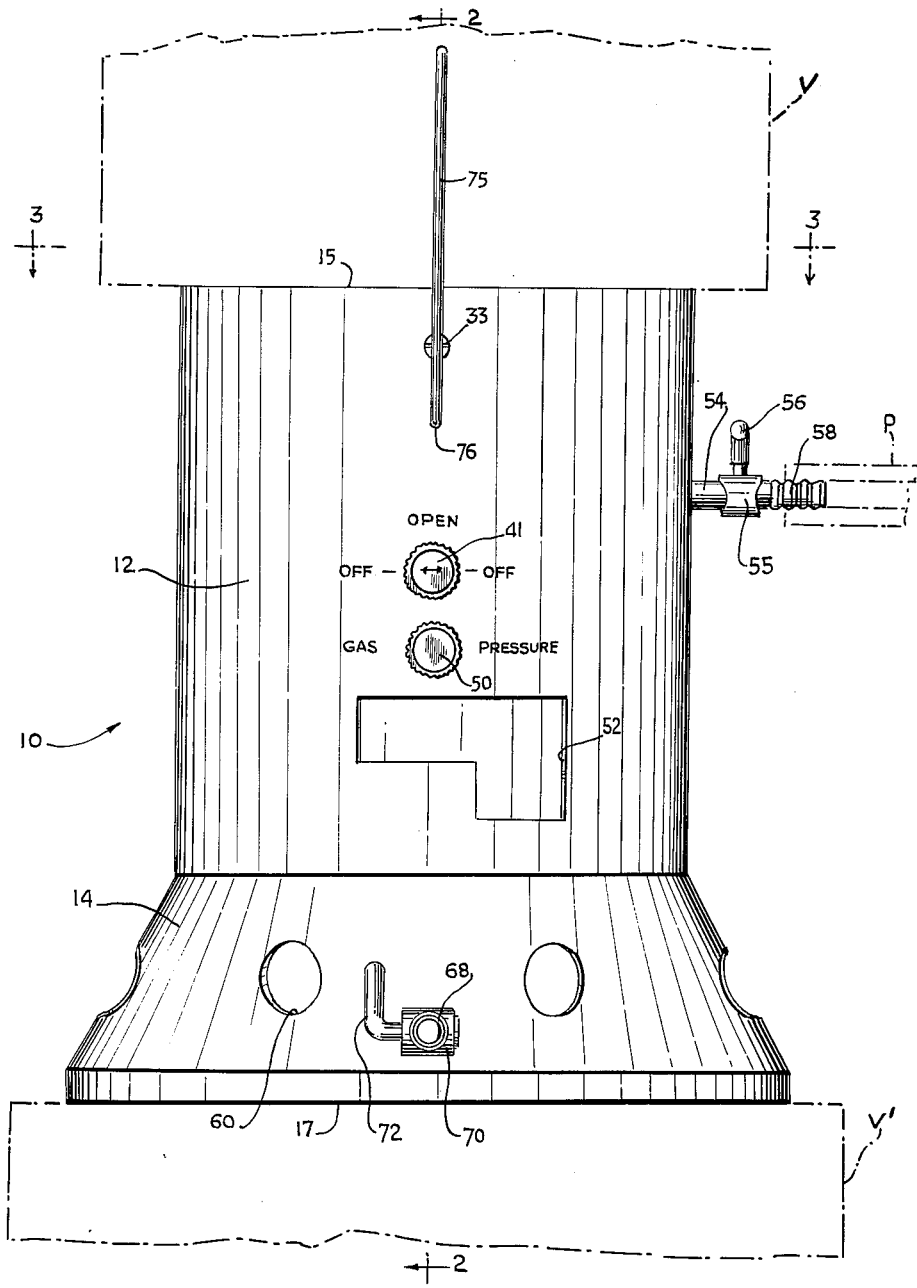
FIG. 1 is a side elevational view of a device embodying the invention.

Referring to the drawings, the device 10 includes a cylindrical housing 12 having a generally conical flaring base or end portion 14. The partition is formed with holes. The housing is open at opposite ends 15, 17. A partition 16 extends across the housing near the flaring end portion 14. On this partition is disposed a closed tank 18 having a cylindrical body 21 and circular end walls 19, 20; see FIG. 2.

A quantity of liquid fuel F may be poured into the tank through a filler tube 22 extending upwardly from end wall 19 and terminating just beyond and outside of an opening 23 in the side of housing 12. A screw cap 24 is provided for the threaded end of tube 22 accessible outside the housing.

A ring burner 25 is provided in the housing near open end 15. This burner has an upper flat annular wall 28 in which is a circumferential series of holes 29 for passing liquid fuel therethrough. The wall 28 is integral with a lower flat annular wall 30. The outer periphery of the ring burner is spaced from the inner surface of the housing and is held stationary by spacer sleeves 32 secured to the ring burner and anchored by screws 33 extending through the wall of the housing at angularly spaced points; see FIG. 3. An annular passage 37 is defined between walls 28, 30 open to holes 29.

A conical fuel distribution chamber 35 is defined by an upper conical wall portion 34 integral wtih wall 28 and a lower conical wall portion 36 integral with wall 30. Extending from the apex of wall portion 36 and integral therewith is an axial main pipe or conduit 38 which terminates at its lower end in the center of end wall 19 of tank 18.

A rotatable ball valve 39 is disposed inside of conduit 38. This valve has a diametral passage 40. The valve is rotated by a shaft 42 connected thereto and extending radially outward of the housing 12. A knob 41 for turning the shaft and valve is mounted on the outer end of the shaft; see FIGS. 2 and 4.

Extending axially downward from conduit 38 is an atomizer pipe 44. This pipe has a tapered nozzle end 45 engaged in the lower end of conduit 38. The pipe 44 has a small lateral hole 46 just below the end wall 19 of the tank open to air space or chamber C above the fluid F. The pipe 44 extends downwardly through the tank and terminates near the bottom end wall 20. A manually operable one-way air pump 48 is mounted on the side of tank 18. This pump opens into air chamber C. The pump has a manually reciprocatable shaft 49 extending radially out of the housing 12. A knob or handle 50 on the shaft 49 facilitates reciprocating the shaft and operating the pump to pump air into the chamber C of tank 18.

Holes 52 are provided in the sides of housing 12 for admitting air. The annular space S between the ring burner 25 and the inner surface of the housing provides a passage for air to support combustion of fuel emitted via holes 29.

A branch conduit 54 is attached to main conduit 38 and opens into this conduit above valve 39; see FIGS. 2 and 4. This branch conduit has a control valve 55 operated by a handle 56. The conduit 54 extends radially out of housing 12 and terminates in a nipple 58 to which a pipe P can be attached for supplying gaseous fuel to the ring burner from a source external to the device; see FIGS. 1 and 3.

In the flaring end portion 14 of the housing is a plurality of circumferentially spaced air holes 60 communicating with the holes in the partition. A wire screen or grid 62 extends across the wider free open end 17 of the housing. Just above this screen or grid is another ring burner 64 supported by brackets 65 on the inner surface of the housing portion 14 just below partition 16. Ring burner 64 has a conduit 66 connected thereto and extending radially outwardly of the wall portion 14. The conduit terminates in a nipple 68 to which a pipe P' can be attached for supplying gaseous fuel from an external source. The ring burner 64 has circumferentially spaced holes 69 on its lower side. A valve 70 operated by a handle 72 is provided in conduit 66 to control flow of gaseous fuel to the ring burner 64. A grate 71 is mounted at the upper end 15 of housing 12 just above burner 25.

A vessel V indicated by dotted lines in FIG. 1 can be mounted on the device 10 and the device can be placed on another vessel V'. Both vessels can be heated simultaneously if jets of gaseous fuel emitted through the holes in both burners are ignited.

A handle 75 is pivotally engaged with the housing at diametrically opposite openings 76 to facilitate carrying the device.

FIG. 5 shows the device in an inverted position with the flaring end portion 14 uppermost. The device can be used in this position with the ring burner 64 emitting gaseous fuel which is burning. Air is admitted to the active burner 64 via holes 60. The burner 25 can also be used with the device in inverted position if gaseous fuel is supplied via branch conduit 54. The valve 39 should be turned off, since the burner 25 will not operate efficiently in the inverted position with tank 18 supplying fuel.

The device is so arranged that it will operate in the upright position of FIGS. 1-3 and in the inverted position of FIG. 5. The burner 25 can be operated with a mixture of fuels supplied simultaneously through conduit 38 from tank 18 and through the branch conduit 54. The valves 39 and 55 will be adjusted to regulate the gas mixture. If desired, the branch conduit 54 can be used as a source of air or oxygen under pressure.

The atomizing arrangement of the pipe 44 in the tank 18 is advantageous since the pressure can be adjusted for most efficient flow of fuel from the tank. Air is entrained with the liquid fuel passing up through pipe 44 and a spray of atomized liquid fuel leaves the opening 43 in the upper end of pipe 44. This atomized spray is distributed and expanded in the annular conical chamber 35 from which the atomized fuel is uniformly distributed around the annular passage 37 defined between walls 28, 30.

While the device is especially intended for heating one or more food vessels, it can be used for other heating purposes.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A heater device for food vessels and the like, comprising a cylindrical housing, a circular burner for liquid or gaseous fuel in said housing at one end thereof, said burner including a pair of flat, annular parallel walls defining an annular passage for gas therebetween, one of said walls having circumferentially spaced holes for passing fuel therethrough from said passage, a pair of generally conical nested other walls integral with the flat walls respectively defining a conical passage communicating with said annular passage, a main conduit extending axially from one of the conical walls for passing fluid fuel therethrough, a cylindrical tank for liquid fuel supported in the housing, said conduit being connected to said tank to receive atomized fuel therefrom, atomizer means in the tank for discharging atomized liquid fuel to said conduit, and manually controllable valve means in said conduit for controlling the flow of fuel therethrough; a branch conduit connected to the main conduit for feeding gaseous fuel from a source external to the housing to the main conduit for mixing with fuel from the tank, and another manually controllable valve in the branch conduit for controlling flow of fuel in the branch conduit, said burner being smaller in diameter than the housing to define an annular space therebetween, said housing having circumferentially spaced holes for passing air into the housing and through said space to support combustion of fuel burning at the holes in the burner.

2. A heater device for food vessels and the like, comprising a cylindrical housing, a circular burner for liquid fuel in said housing at one end thereof, said burner including a pair of flat, annular parallel walls defining an annular passage for gas therebetween, one of said walls having circumferentially spaced holes for passing liquid fuel therethrough from said passage, a pair of generally conical nested other walls integral with the flat walls respectively defining a conical passage communicating with said annular passage, a main conduit extending axially from one of the conical walls for passing fluid fuel therethrough, a cylindrical tank for liquid fuel supported in the housing, said conduit being connected to said tank to receive atomized fuel therefrom, atomizer means in the tank for discharging atomized liquid fuel to said conduit, and manually controllable valve means in said condit for controlling the flow of fuel therethrough, said atomizer means including an air and liquir mixer pipe extending from said main conduit in the tank at one side thereof to an opposite side of the tank, and an air pump connected to the tank and having manually operable control means outside of the housing for feeding and compressing air in the tank in a chamber around said mixer pipe at said one side of the tank, said mixer pipe being laterally apertured to admit air under pressure laterally from said chamber while the air under pressure in the chamber forces liquid through the mixer pipe to be entrained by the air admitted laterally into the mixer pipe, whereby atomized liquid is sprayed into said conical passage and expanded therein.

3. A heater device for food vessels and the like, comprising a cylindrical housing, a circular burner for liquid fuel in said housing at one end thereof, said burner including a pair of flat, annular parallel walls defining an annular passage for liquid fuel therebetween, one of said walls having circumferentially spaced holes for passing gas therethrough from said passage, a pair of generally conical nested other walls integral with the flat walls respectively defining a conical passage communicating with said annular passage, a main conduit extending axially from one of the conical walls for passing fluid fuel therethrough, a cylindrical tank for liquid fuel supported in the housing, said conduit being connected to said tank to receive atomized fuel therefrom, atomizer means in the tank for discharging atomized liquid fuel to said conduit, and manually controllable valve means in said conduit for controlling the flow of fuel therethrough, said atomizer means including an air and liquid mixer pipe extending from said main conduit in the tank at one side thereof to an opposite side of the tank, and an air pump connected to the tank and having manually operable control means outside of the housing for feeding and compressing air in the tank in a chamber around said mixer pipe at said one side of the tank, said mixer pipe being laterally apertured to admit air under pressure laterally from said chamber while the air under pressure in the chamber forces liquid through the mixer pipe to be entrained by the air admitted laterally into the mixer pipe, whereby atomized liquid is sprayed into said conical passage and expanded therein, said burner being smaller in diameter than the housing to define an annular space therebetween, said housing having circumferentially spaced holes for passing air into the housing and through said space to support combustion of fuel burning at the holes in the burner.

4. In a liquid fuel burner, in combination, a hollow cylindrical housing, open at both ends, one end being flared and serving as the base, said base being perforated, a grille supported at the other end of the housing, an annular perforated burner supported in the housing closely spaced inwardly of the grille, a built-in fuel tank spaced inwardly of the annular burner, an inlet for fuel communicating with said tank, an atomizer pipe depending into the center of said tank, an atomizer head on the top of the atomizer pipe protruding outwardly of the tank, an upright integral conduit on the tank communicating at its bottom with the atomizer head, and a conical shaped distributor head, said burner being above and supported by the distributor head, said distributor head being above and supported by the integral conduit, said burner, distributor head and integral conduit being integral, air pump means supported on the tank for supplying air to the atomizer pipe, and valve means in the integral conduit operable from outsde the housing for controlling the flow of liquid fuel through the integral conduit.

References Cited by the Examiner

UNITED STATES PATENTS

| | | | |
|---|---|---|---|
| 218,476 | 8/79 | Bliesner | 158—11 |
| 1,322,453 | 11/19 | Jungk | 158—11 |
| 2,455,950 | 12/48 | Robinson | 158—33 |
| 2,744,809 | 5/56 | Falligant | 126—38 X |

FREDERICK L. MATTESON, JR., *Primary Examiner.*

JAMES W. WESTHAVER, *Examiner.*